US009394449B2

(12) United States Patent
Auger et al.

(10) Patent No.: US 9,394,449 B2
(45) Date of Patent: Jul. 19, 2016

(54) LUMINESCENT CARBON PARTICLES, METHOD FOR PREPARATION AND USE

(71) Applicant: Commissariat A L'Energie Atomique Et Aux Energies Alternatives, Paris (FR)

(72) Inventors: Aurélien Auger, Le Mans (FR); Philippe Capron, Virieu sur Bourbre (FR); Nicolas Charvet, Voreppe (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 279 days.

(21) Appl. No.: 14/153,519

(22) Filed: Jan. 13, 2014

(65) Prior Publication Data

US 2014/0212580 A1 Jul. 31, 2014

(30) Foreign Application Priority Data

Jan. 31, 2013 (FR) ...................................... 13 50839

(51) Int. Cl.
| | | |
|---|---|---|
| *B05D 5/12* | (2006.01) | |
| *C09D 5/22* | (2006.01) | |
| *C09D 11/00* | (2014.01) | |
| *C09K 11/65* | (2006.01) | |

(52) U.S. Cl.
CPC ...... *C09D 5/22* (2013.01); *C09D 11/00* (2013.01); *C09K 11/65* (2013.01)

(58) Field of Classification Search
USPC ........................................................ 427/157
See application file for complete search history.

(56) References Cited

U.S. PATENT DOCUMENTS

| | | | |
|---|---|---|---|
| 2006/0112858 A1 | 6/2006 | Nguyen | |
| 2010/0181534 A1 | 7/2010 | Shenderova et al. | |
| 2011/0189702 A1* | 8/2011 | Sun ..................... | B82Y 15/00 435/7.21 |
| 2012/0043751 A1* | 2/2012 | Hersch ................. | B41M 3/144 283/92 |
| 2012/0114563 A1* | 5/2012 | Carter ................ | A61K 49/0054 424/9.6 |

FOREIGN PATENT DOCUMENTS

| | | |
|---|---|---|
| WO | 2007/050984 A2 | 5/2007 |
| WO | 2010/008519 A2 | 1/2010 |
| WO | 2012/158478 A1 | 11/2012 |

OTHER PUBLICATIONS

Nakayama-Ratchford et al. "Noncovalent Functionalization of Carbon Nanotubes by fluorescein-Polyethylene Glycol: Supramolecular Conjugates with pH-Dependent Absorbance and Fluorescence" (2007).*
Kainz et al. "Combined Covalent and noncovalent functionalization of nanomagnetic carbon surfaces with dendrimers and Bodipy fluorescent dye" (2011).*
French Search Report (Application No. 13.50839) dated Oct. 15, 2013.

* cited by examiner

*Primary Examiner* — Austin Murata
(74) *Attorney, Agent, or Firm* — Burr & Brown, PLLC

(57) ABSTRACT

These luminescent carbon particles have a carbon core and an external polymeric coating containing at least one luminophore.

6 Claims, 2 Drawing Sheets

LUMINESCENT CARBON PARTICLES, METHOD FOR PREPARATION AND USE

BACKGROUND OF THE INVENTION

1. Field of the Invention

The invention concerns particles of luminescent carbon, which can notably be used in the field of counterfeiting prevention.

2. Description of Related Art

Luminescence is the emission of light in a rapid manner (fluorescence) or slower manner (phosphorescence) subsequent to the absorption of photons by a molecule previously having been excited.

The luminescent particles can be incorporated within an ink, thus allowing objects to be marked. They can thus provide a means of identification that is generally invisible to the naked eye, with detection possibly requiring a specific wavelength of excitation.

Such is notably the case with fluorescent particles.

The fluorescent properties of particles of homogeneous composition in accordance with past art are generally conferred during their synthesis. However, this solution is not suitable for the preparation of black inks, which absorb all wavelengths of excitation. The fluorescence of particles according to prior art is therefore annihilated when they are used for preparing a black ink, because the excitation energy is absorbed by the black color.

To overcome this, metallic particles having a structure of core/shell type have been developed. Notably, cobalt/carbon particles are employed, of which the carbon shell has been functionalized at the surface by means of hybrid groupings such as the association of pyrene and BODIPY.

The BODIPY groupings responsible for the fluorescence are thus distanced from the core of the particle, so as to prevent the phenomena of "quenching" (deactivation) of the fluorescence.

However, these particles require a process of synthesis that is painstaking as regards the steps of preparation of metallic particles, of the coating of the metallic particles, and of the functionalization of the coating by means of a hybrid mixture of compounds. The synthesis involves multiple stages and is difficult.

The Applicant has developed luminescent particles of carbon that allow the preparation of a black ink with luminescent properties.

Furthermore, the process of preparation of these particles allows one to adapt the nature of the surface of these particles for their usage, without requiring a complex functionalization stage.

SUMMARY OF THE INVENTION

The Applicant has developed luminescent particles of carbon having a core/shell structure. These particles are advantageously of black color, namely the same color as carbon. In other words, even if the core of the particles absorbs all optical radiation and, therefore, all excitation energy, these particles nonetheless have luminescent properties.

The luminescence is due to luminophores in the shell part of the particles.

More precisely, the invention covered herein concerns a luminescent carbon particle with:
a carbon core;
an external polymeric coating containing at least one luminophore.

More particularly, the invention also concerns a nanomaterial formed by an agglomeration of multiple particles of carbon with a core/shell structure.

By agglomeration of particles, it is meant a nanomaterial formed by the agglomeration of the said carbon particles. Thus, according to the invention, the agglomeration includes multiple luminescent carbon particles coated with an external polymeric material including at least one luminophore, with the said particles being linked to each other by the polymeric material.

The luminescent carbon particle and the agglomerate advantageously include the following in weight, in relation to the weight of the particle:
60 to 90% of carbon (core of the particle);
5 to 20% of polymer;
5 to 20% of luminophore.

The core of the carbon particle is advantageously the black of carbon or of graphite.

Advantageously, the carbon particles of the invention are spherical in form. Their diameter is preferably between 10 and 500 nanometers and, even more advantageously, between 20 and 100 nanometers.

Advantageously, the carbon particle agglomerates according to the invention are spherical in form. Their diameter is preferably between 0.1 and 10 nm and, even more advantageously, between 1 and 100 nm.

The carbon core of the particle advantageously has a diameter between 10 and 500 nanometers, and the thickness of the external coating (shell) is preferably between 1 and 20 nanometers.

Generally, the polymeric coating includes at least one polymer that can be chosen from the group including poly(allylamine hydrochloride), such as the compound of formula CAS 71550-12-4 for example; polyacrylic acid; polyvinyl alcohol; PVP (polyvynil pyrolidone); PEO (polyethyl oxazoline); PEI (polyethylene imine); PEG (polyethylene glycol); PMMA (methyl polymethacrylate); poly(methyl vinyl ether-alt-maleic anhydride); poly(maleic anhydride-alt-1-octadecen); and their mixtures.

This polymer can be hydrosoluble or hydrophobic.

As already stated, the luminescent carbon particle has the color of the carbon core. In other words, the coating is transparent or practically transparent.

As regards the luminophore, it can be advantageously chosen from the group including 1-pyrene carboxylic acid (fluorophore); anthracene; fluoresceine; rhodamine; cyanines; 1-pyrene boronic acid;7-diethylamino-4-methylcoumarin; their derivatives; and their mixtures.

The luminophore is advantageously a fluorophore, and also has an ionizable charge or a chemical affinity with carbon particles. By chemical affinity, it is notably meant electrostatic forces, Van der Waals forces, or $\pi$-$\pi$ assemblies. Contrary to particles according to prior art, the particle covered by the invention does not require functionalization; the luminophore is contained/encapsulated within the polymeric coating.

The particle covered by the invention is advantageously fluorescent.

This invention also concerns an ink incorporating the luminescent carbon particle described above, or an agglomeration of these particles. It is a suspension in the ink; the polymer remains attached to the particle and allows the solubility in the solvent of the ink, which can be water-based or organic (such as MEK [methyl ethyl cetone, acetone, ethanol, etc.).

The ink is advantageously of the same color as the core of the particles and/or agglomeration of these particles, namely black.

The process for preparation of the luminescent carbon particle and/or of an agglomeration of these particles notably includes the following stages:

preparation of a suspension (water-based or organic) including at least carbon particles and at least one polymer;

addition of at least one luminophore to this suspension;

formation of luminescent carbon particles and/or of an agglomeration of these particles, by drop-by-drop thermal tempering of the said suspension at a temperature advantageously between −200 and −180° C., and more advantageously in liquid nitrogen (−196° C.);

lyophilization of the particles.

Thus, the luminophore can be distributed uniformly within the polymer layer covering the carbon core of the particles according to the invention.

The tempering-based process, preferably using liquid nitrogen, followed by the lyophilization allows the creation of a nanomaterial formed of an agglomeration of particles, that has the polymere—which also contains the luminophore— between each elementary carbon particle.

The suspension used in this process advantageously includes the following in weight, in relation to the dry weight of the suspension:

60 to 90% of carbon particles;
5 to 20% of polymer;
5 to 20% of luminophore.

The thermal tempering stage consists of quickly cooling the suspension, notably in a liquid nitrogen bath. The surface environment of the carbon particles is thus frozen.

The suspension is advantageously fed into the liquid nitrogen drip by drip. The size of the drops enables one to adjust the size of the agglomerate obtained after lyophilisation.

The carbon particles initial employed within this process can be ground before coating, in accordance with techniques of general knowledge to an appropriately-knowledgeable professional. They are then mixed with at least one vehicle solvent (organic or water-based), in order to prepare the suspension used in the first stage.

An alkali (ammonia, for example) or an acid can then be added, notably in the case of a water-based environment, before or after the addition of the luminophore. This helps to ionize the luminophore, which can then confine itself in the polymer coating covering the core of the particle.

The vehicle solvent can notably be chosen from the group including water; DMF; DMSO; and ethanol.

Advantageously, the suspension has a ratio in weight of carbon particles to luminophore of 4 or more and, more advantageously, more than 10. This is because, when the ratio of weight of carbon particles to luminophore is too low, fluorescent polymer particles (with no carbon core) can be produced.

In addition, these carbon particles (non-luminescent) are advantageously between 60 and 90% of the weight of suspension used in the process.

The invention herein also concerns an object incorporating the luminescent carbon particle described above.

The process for the preparation of this object consists in deposing, on a substrate, an ink containing luminescent particles with a carbon core and an external polymeric coating containing at least one luminophore. This can be a substrate of glass, paper, cardboard, metal or plastic, for example. Furthermore, as already explained, the ink can contain an agglomeration of particles.

This deposition can be likened to a marking stage. It is advantageously performed by ink jet printing, silk-screen printing, offset printing, etc.

The objects thus marked can notably have an application within the scope of counterfeiting prevention. This marking can reveal an identifiable pattern applied, for example, via fluorescence spectroscopy, by special excitation of the marking.

The invention, and the resulting advantages, will come to the fore better by means of the following Figures and examples, which are provided to illustrate the invention in a non-limitative manner.

DESCRIPTION OF THE INVENTION

Preparation of luminescent carbon particles:

0.25 g of poly(allylamine hydrochloride) (PAA $M_w$ 15000; CAS number 71550-12-4) are added to 300 mL of de-ionized water.

The resulting mixture is agitated at ambient temperature until total dissolution of the polymer.

Next, 1 g of finely-ground carbon particles (FIG. 2) are added to the polymer solution. This suspension thus has a ratio in weight of carbon to PAA of 4.

The mixture is then agitated at ambient temperature until a black-colored suspension is obtained.

0.20 g of 1-pyrene carboxylic acid luminophore (20% in weight in relation to the weight of carbon particles) are added while briskly agitating the suspension.

20 drops of water-based ammonia (30% in weight) are then added.

A uniform suspension is obtained after 15 minutes of agitation at ambient temperature. This brisk agitation is maintained for 6 hours.

The suspension is then tempered in liquid nitrogen (T=−196° C.), drop by drop, so as to form beads that are then filtered and lyophilized (24 hrs; T=−50° C.; P=50 torr).

The material obtained after lyophilization takes the form of black beads or around 5 millimeters diameter (agglomeration of elementary particles).

Figure 1:
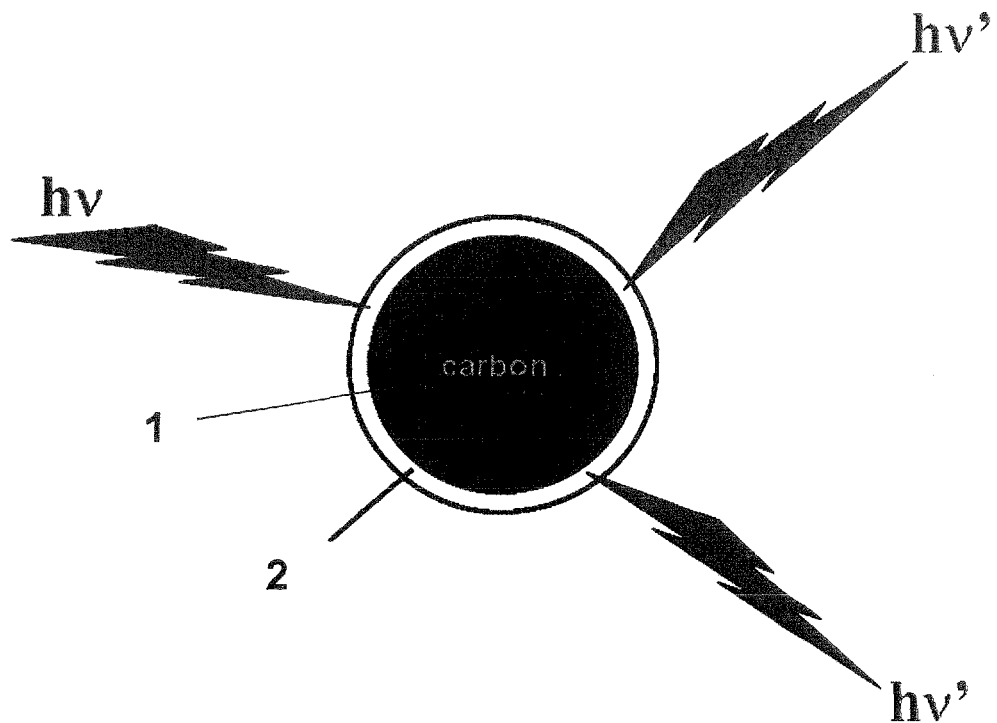
FIG. 1 illustrates a luminescent carbon particle according to the invention.

A particle of luminescent carbon is illustrated in FIG. 1. The particle has a carbon core (1) covered with a luminescent polymer layer (2).

The yield of the process is 97%, namely 1.404 g in relation to the non-luminescent particles employed in the process.

The material can be dispersed in an ink.

Figure 2:
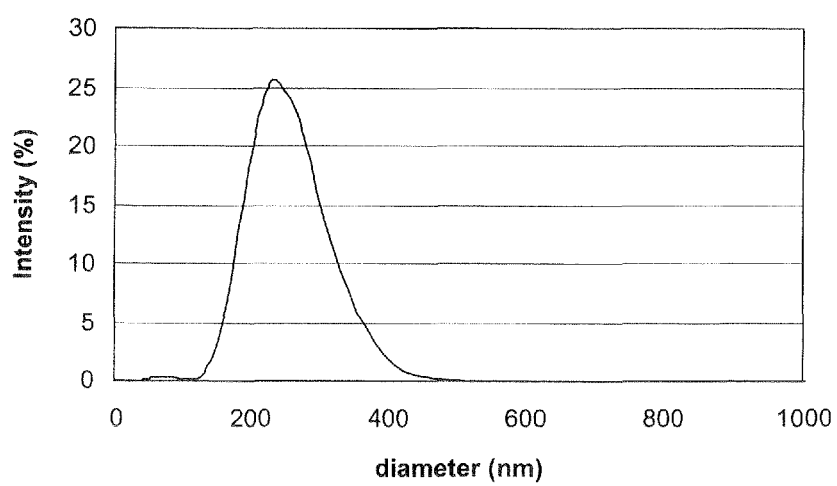
FIG. 2 illustrates the profile of the distribution of size of ground carbon particles according to prior art, before they are employed in the process addressed by the invention.

These initial carbon particles have been characterized in terms of DLS (dynamic light suffusion) after grinding (average diameter 220 nanometers (FIG. 2).

Figure 3:
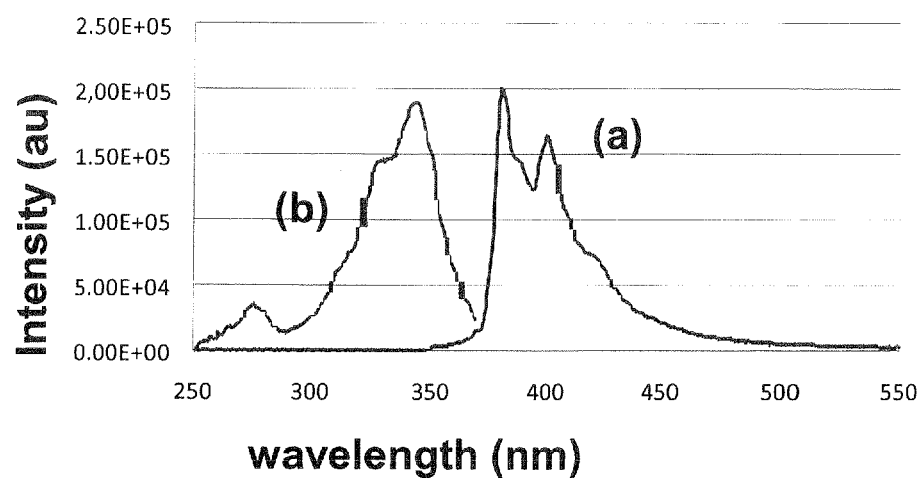
FIG. 3 illustrates the wavelengths of emission (a) and excitation (b) of luminescent particles according to the invention.

The luminescent carbon particles according to the invention have been characterized via fluorescence spectroscopy. They have an excitation wavelength $\lambda_{ex}$=343 nm, and an emission wavelength $\lambda_{em}$=380 nm (FIG. 3).

The excitation energy hv and emission energy hv' are illustrated in FIG. 1.

The invention claimed is:

1. A method for preparing luminescent carbon particles having a carbon core and an external polymeric coating containining at least one luminophore and/or an agglomeration of the particles, the method comprising the steps of:

preparing a suspension including at least one of the carbon particles and at least one polymer;

adding at least one luminophore to the suspension;

forming luminescent carbon particles and/or an agglomeration of the particles by drop-by-drop tempering of the suspension, at a temperature between −200 and −180° C.; and performing lyophilization of the particles.

2. The method according to claim 1, wherein the suspension has a ratio in weight of carbon particles to luminophores of 4 or more.

3. The method according to claim 1, wherein the polymeric coating includes at least one polymer selected from the group consisting of poly(allylamine hydrochloride), polyacrylic acid, polyvinyl alcohol, polyvynil pyrolidone, polyethyl oxazoline, polyethylene imine, polyethylene glycol, methyl polymethacrylate, poly(methyl vinyl ether-alt-maleic anhydride), poly(maleic anhydride -alt-1-octadecen), and mixtures thereof.

4. The method according to claim 1, wherein the luminophore is selected from the group consisting of 1-pyrene carboxylic acid, anthracene, fluoresceine, rhodamine, cyanines, 1-pyrene boronic acid, 7-diethylamino-4-methylcoumarin, derivatives thereof, and mixtures thereof.

5. The method according to claim 1, wherein the particle is fluorescent and is spherical in shape, with a diameter between 10 and 500 nanometers.

6. The method according to claim 5, wherein the particle has a diameter between 20 and 100 nanometers.

* * * * *